United States Patent [19]

Yasukawa

[11] Patent Number: 5,245,595
[45] Date of Patent: Sep. 14, 1993

[54] ZONE MISS RECOVERY SYSTEM FOR DISK DRIVES USING A MODIFIED CONSTANT ANGULAR VELOCITY (MCAV) METHOD OF DATA RECORDING

[75] Inventor: Masaaki Yasukawa, Suwa, Japan

[73] Assignee: Seiko Epson Corporation, Tokyo, Japan

[21] Appl. No.: 520

[22] Filed: Jan. 4, 1993

Related U.S. Application Data

[63] Continuation of Ser. No. 744,183, Aug. 8, 1991, abandoned.

[30] Foreign Application Priority Data

| Aug. 22, 1990 | [JP] | Japan | 2-220593 |
| Aug. 23, 1990 | [JP] | Japan | 2-221940 |
| Aug. 24, 1990 | [JP] | Japan | 2-223815 |
| Sep. 3, 1990 | [JP] | Japan | 2-232954 |
| May 30, 1991 | [JP] | Japan | 3-127540 |

[51] Int. Cl.⁵ .............. G11B 19/24; G11B 21/08
[52] U.S. Cl. .................................. 369/32; 369/50; 360/73.03; 360/78.14
[58] Field of Search .............. 369/32, 44.28, 48, 50; 360/51, 48, 73.03, 78.14, 78.04, 78.06, 78.07

[56] References Cited

U.S. PATENT DOCUMENTS

| 4,488,189 | 12/1984 | Axmear et al. | 360/78 |
| 4,514,771 | 4/1985 | Stark et al. | 360/73.03 |
| 4,530,018 | 7/1985 | Hoshino et al. | 360/73.03 |
| 4,536,863 | 8/1985 | Giddings | 369/43 |
| 4,750,059 | 6/1988 | Syracuse | 360/73.03 |
| 4,780,866 | 10/1988 | Syracuse | 360/48 |
| 4,896,311 | 1/1990 | Ishihara | 369/47 |
| 4,918,677 | 4/1990 | Ashinuma et al. | 360/78.14 |

FOREIGN PATENT DOCUMENTS

| 1-83475 | 7/1990 | Japan . |
| 1-89742 | 7/1990 | Japan . |
| 1-89769 | 7/1990 | Japan . |
| 90/003850 | 2/1991 | PCT Int'l Appl. . |

*Primary Examiner*—Donald McElheny, Jr.

[57] ABSTRACT

A disk drive zone access method for recovering from a zone miss of a disk drive head(s) is used with media that has a plurality of zones each having different data recording frequencies. Data is read with a variable reference synchronizing frequency that can be set to match any one of the data recording frequencies. The method comprises 1) defining a memory space to stores zone miss history in alternative memory spaces according to the head seek direction at the time of a zone miss; 2) referencing the one zone miss history that corresponds to the present head seek direction; 3) estimating a candidate zone where the head is/are most likely to be, based on the zone miss history; 4) setting the variable reference synchronizing frequency to the data recording frequency of the candidate zone; and 5) updating zone miss history in the memory space with the present zone miss data according to the head seek direction at the time of the zone miss.

11 Claims, 13 Drawing Sheets

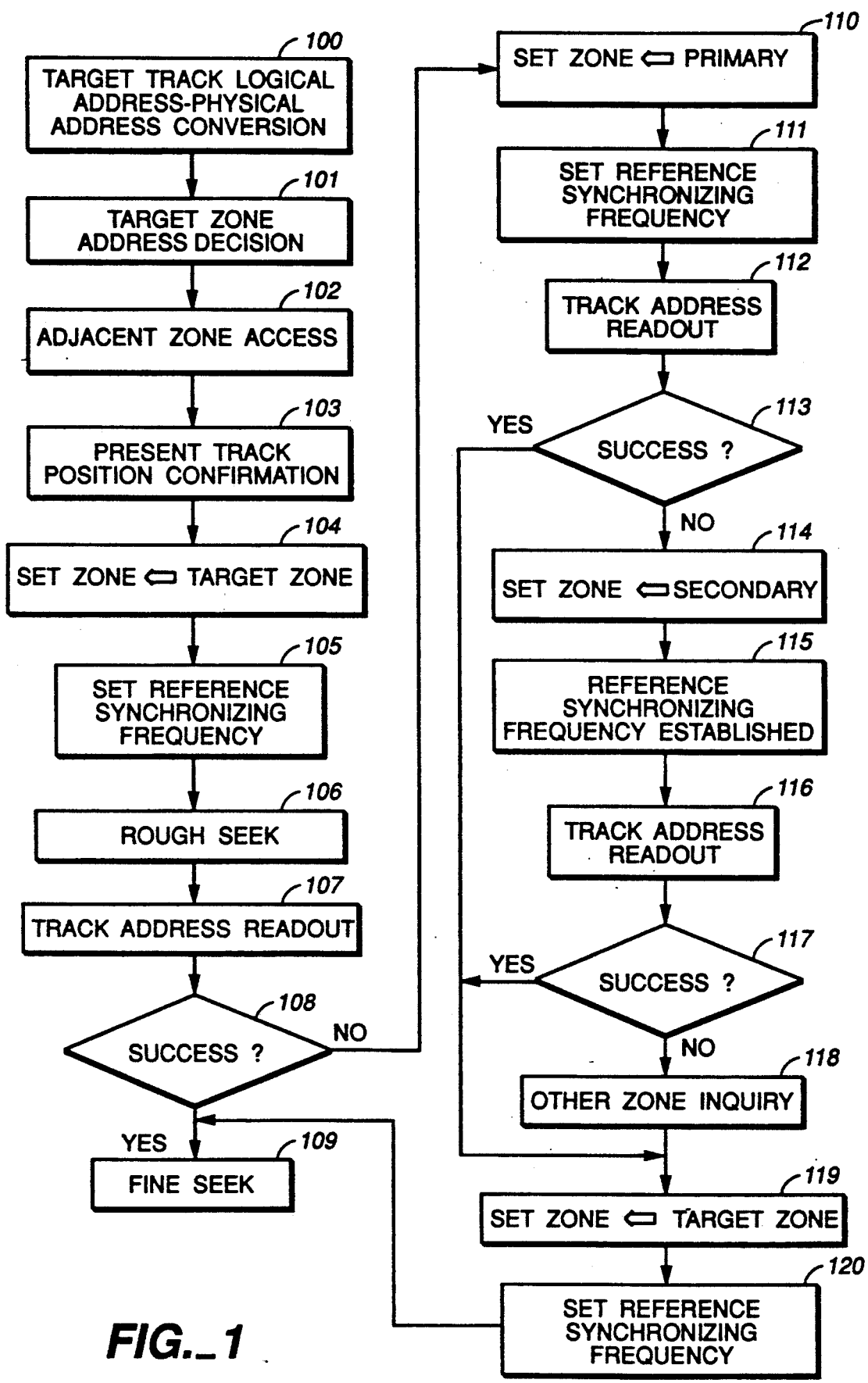
FIG._1

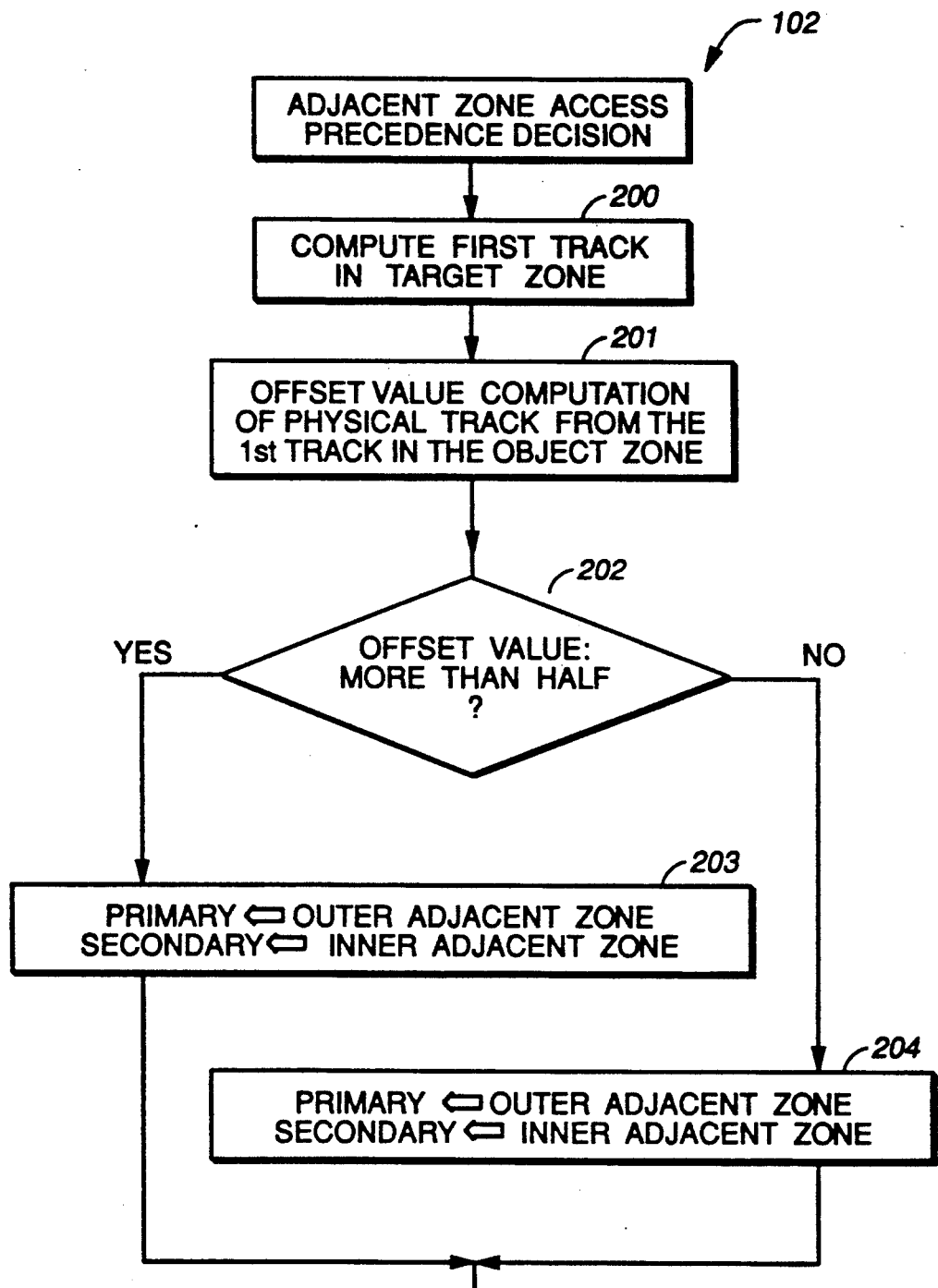
FIG._2

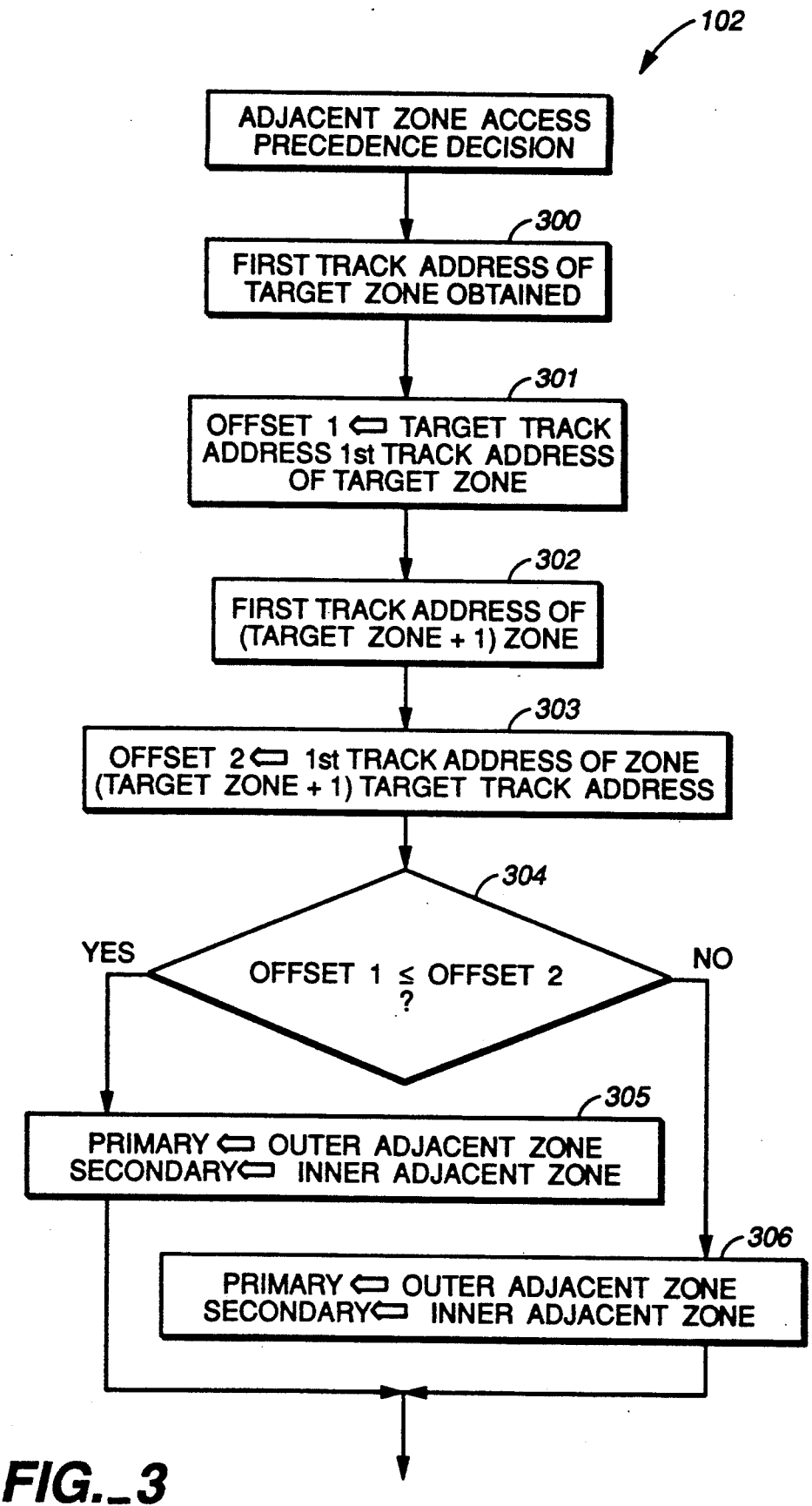
FIG._3

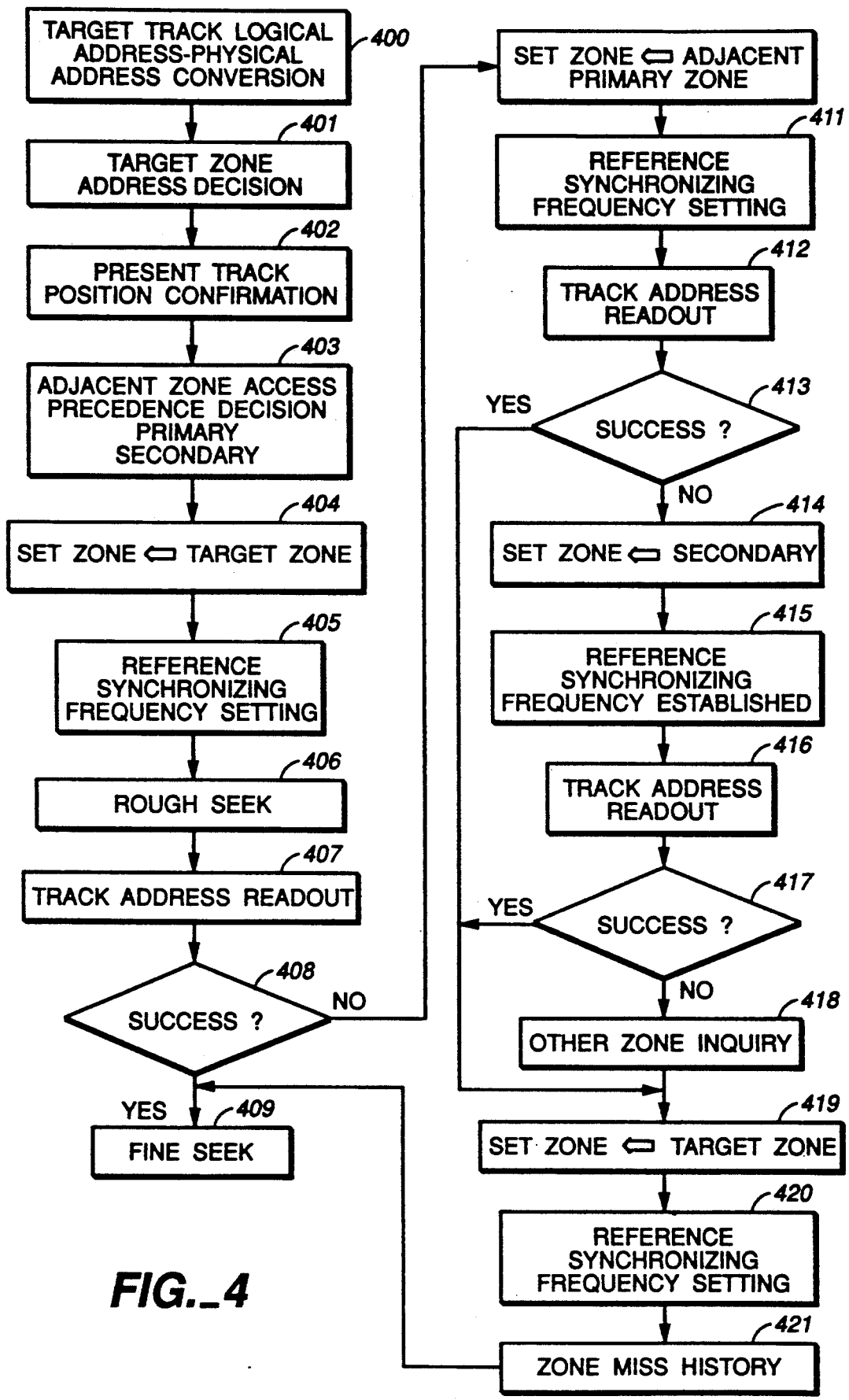
FIG._4

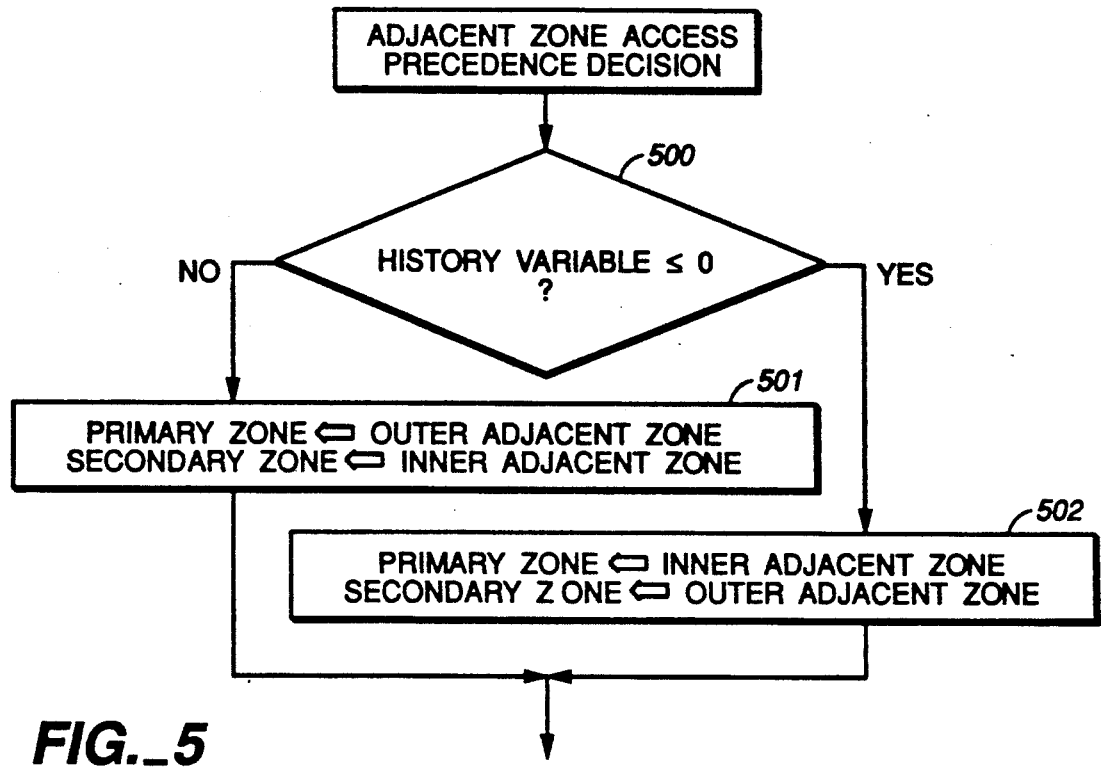
FIG._5
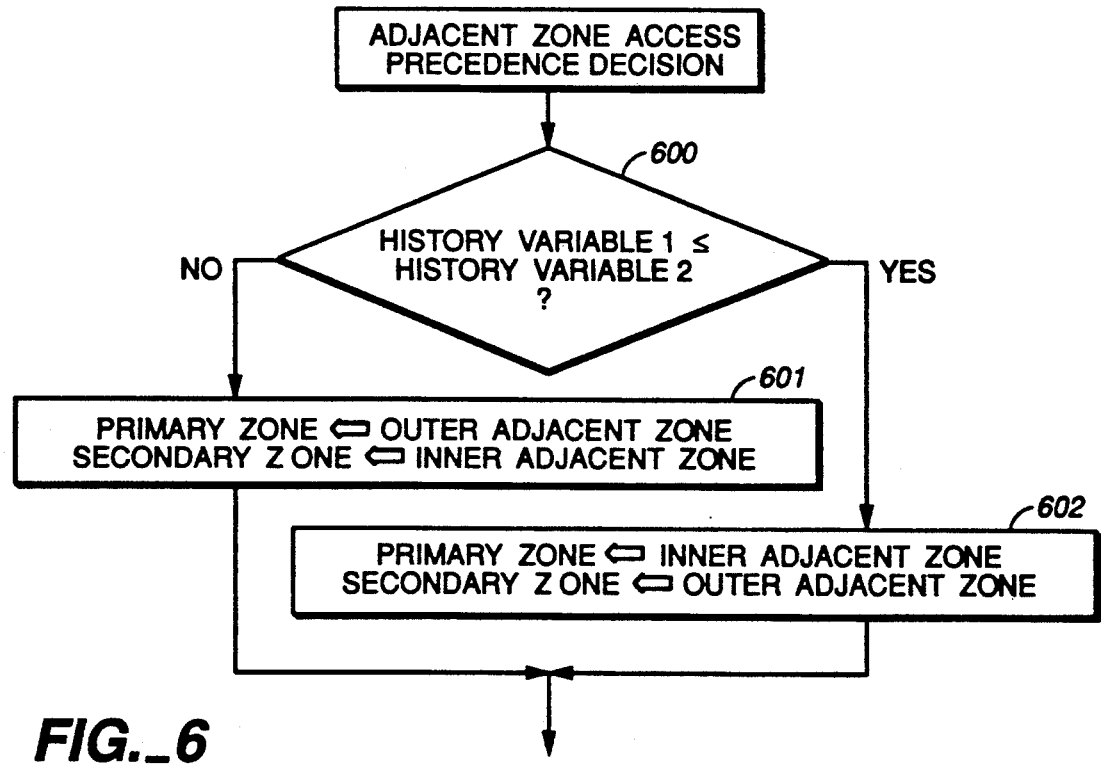
FIG._6

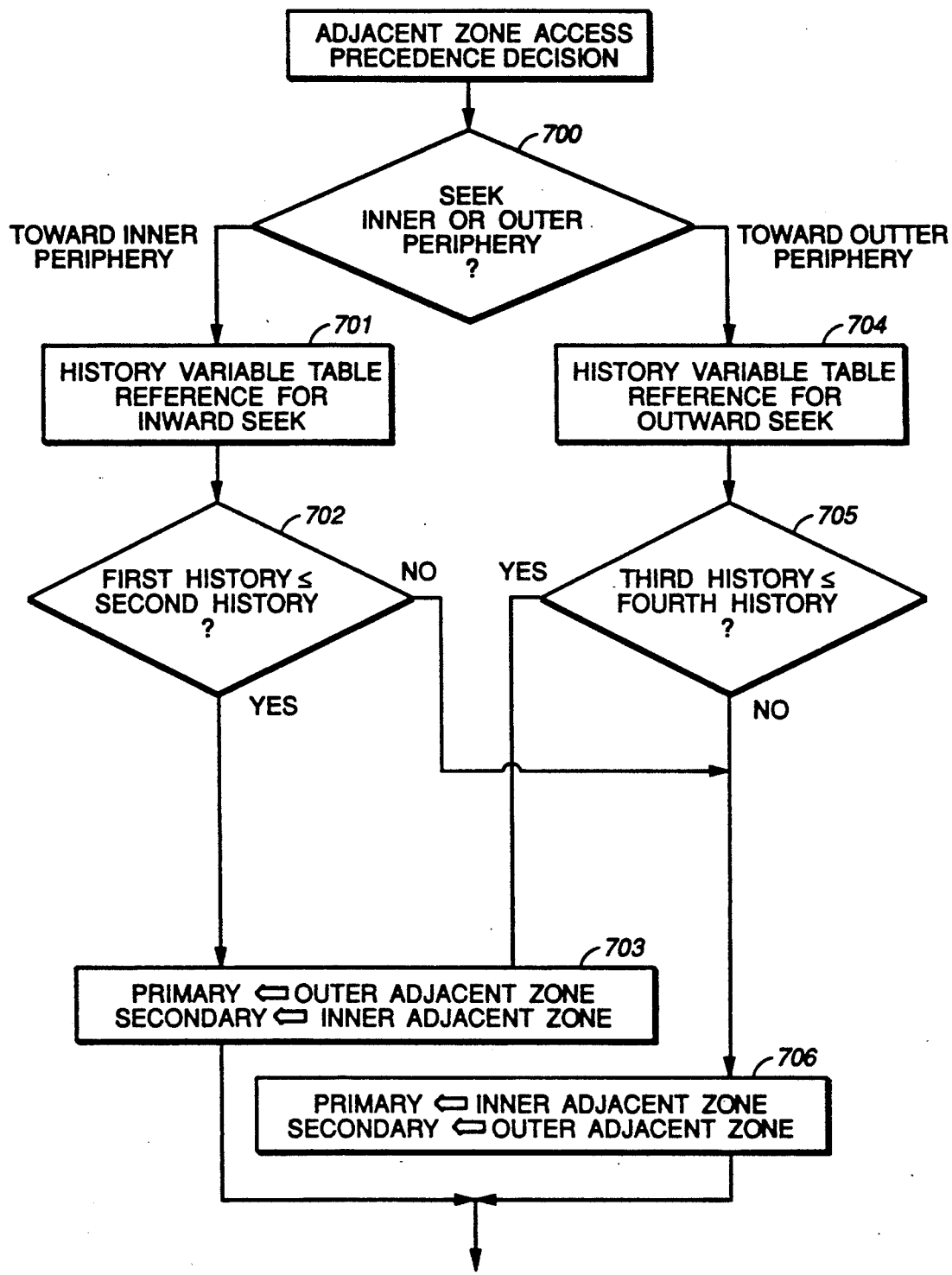
FIG._7

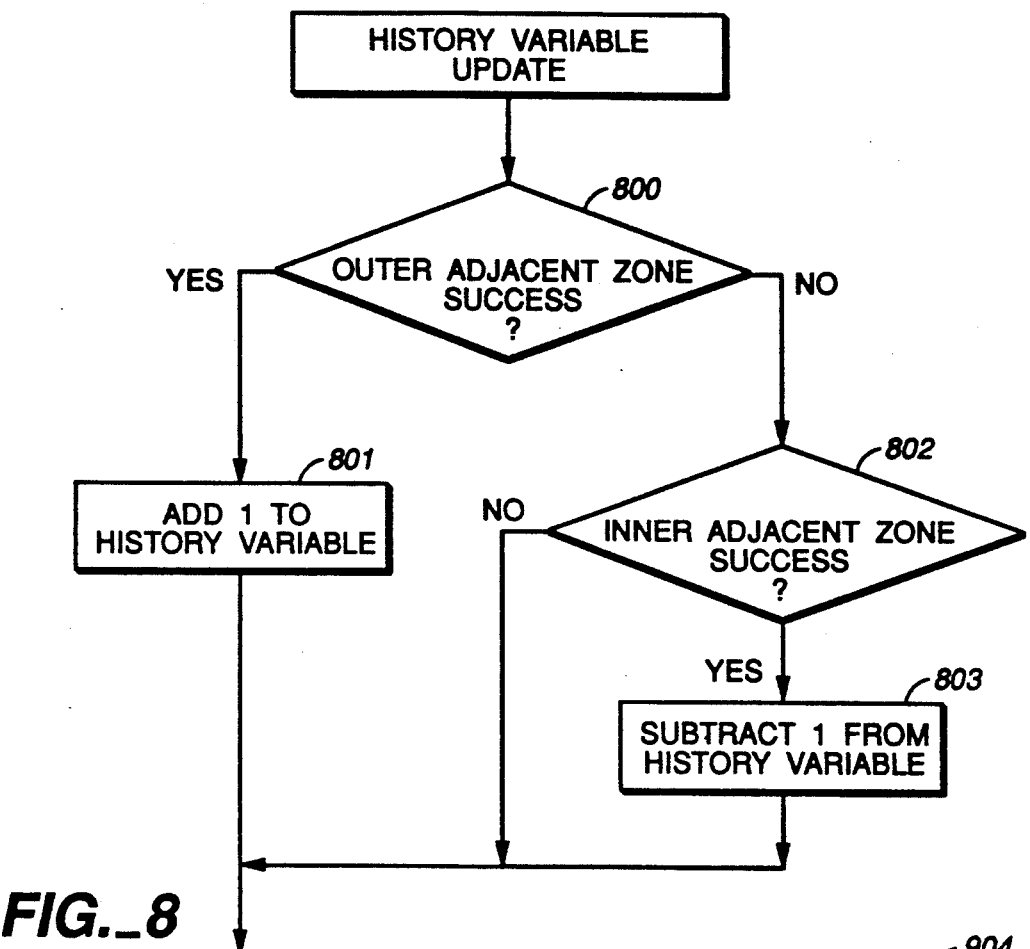
FIG._8
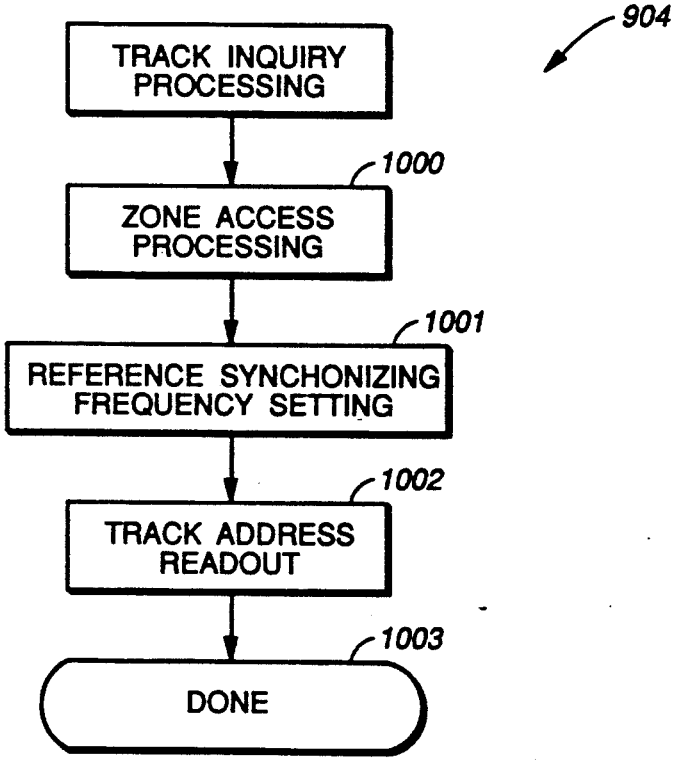
FIG._10

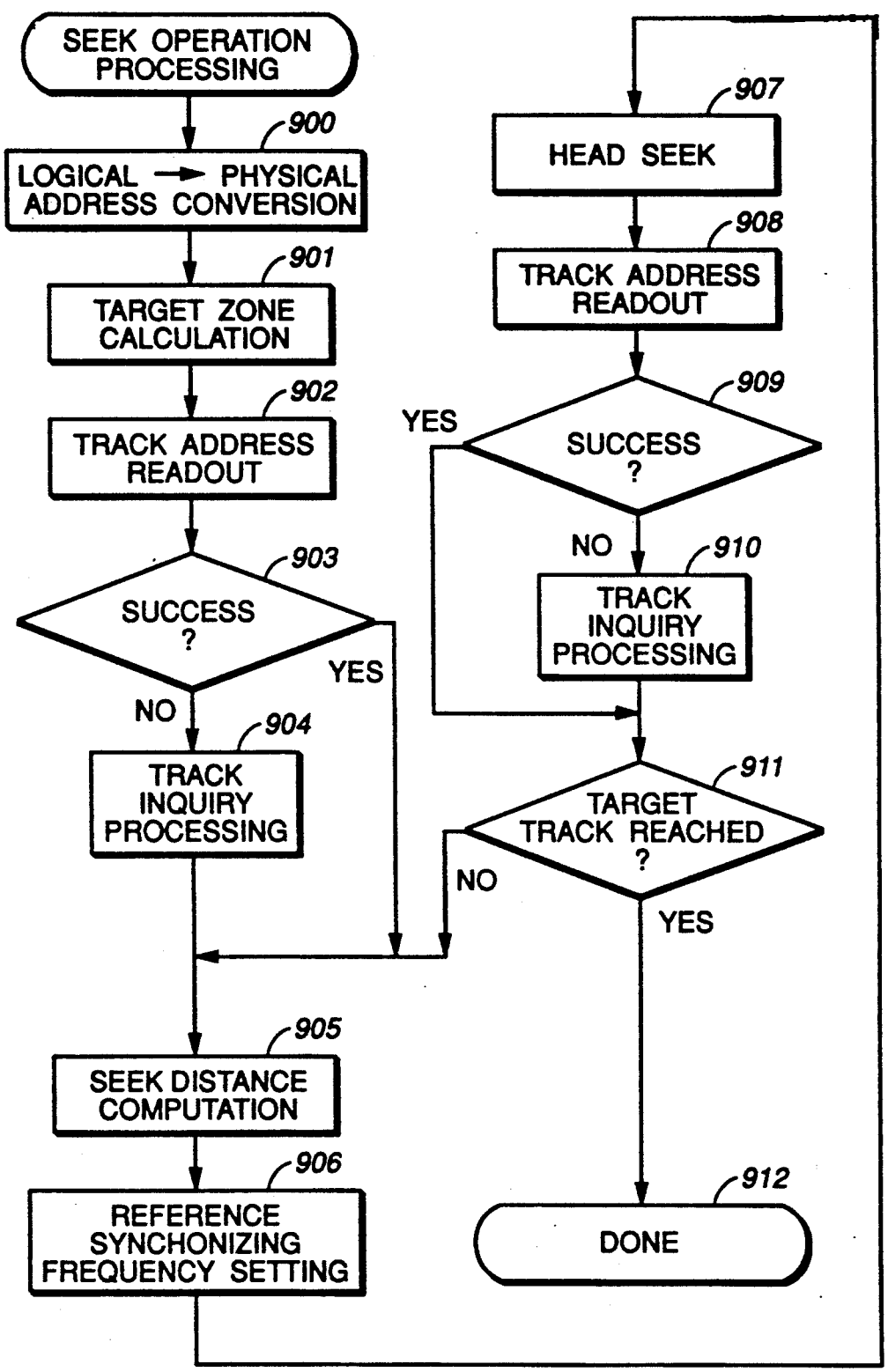
FIG._9

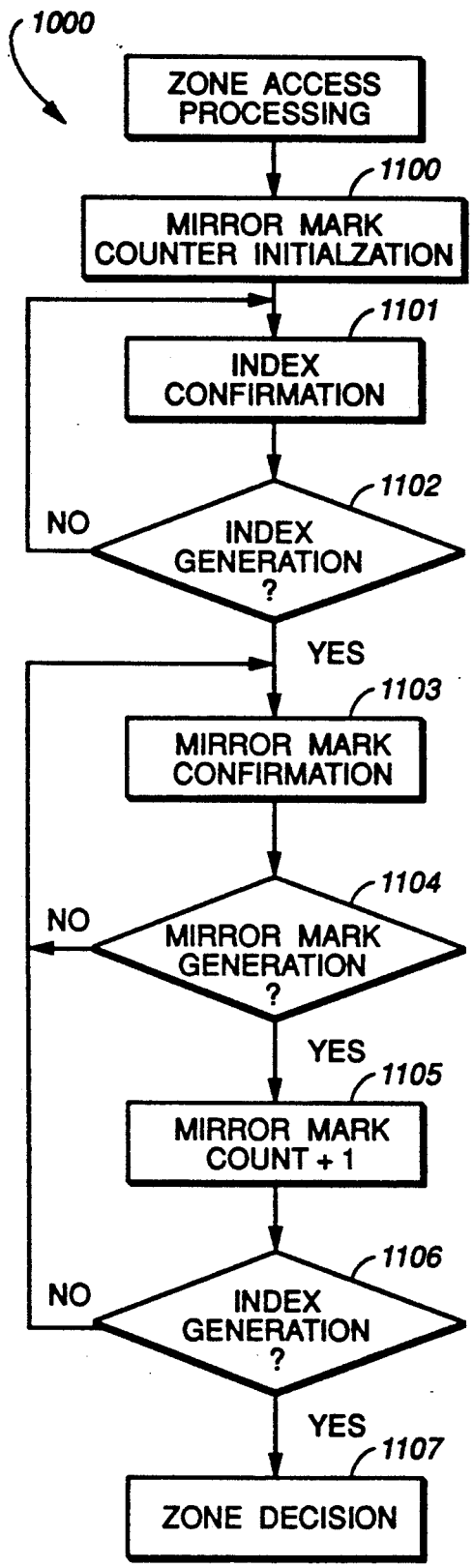
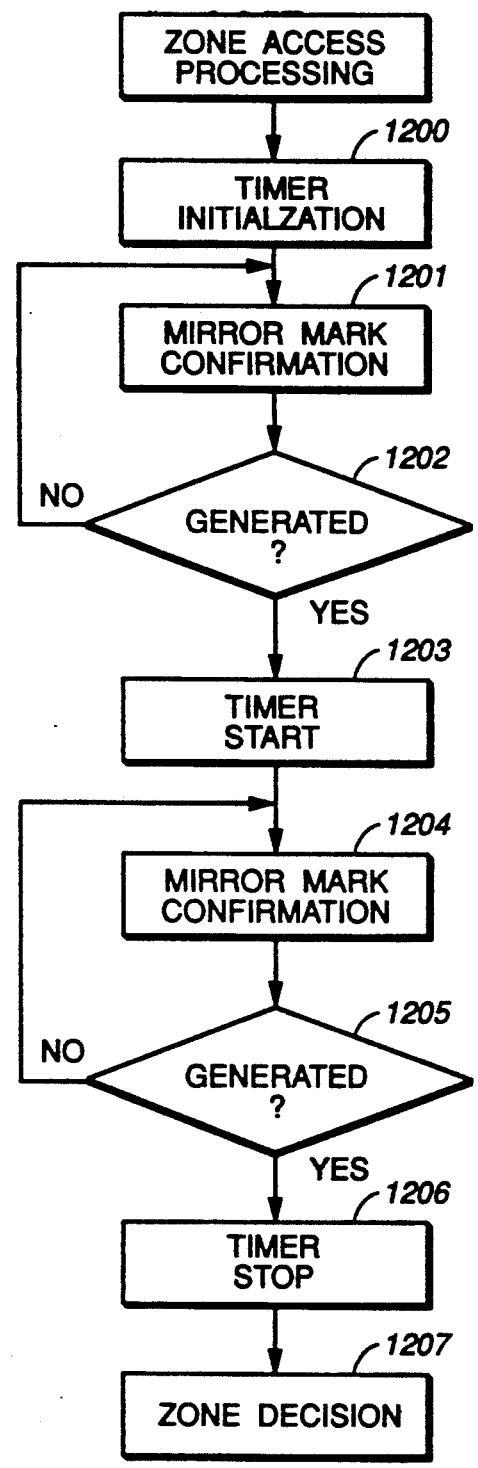
FIG._11
FIG._12

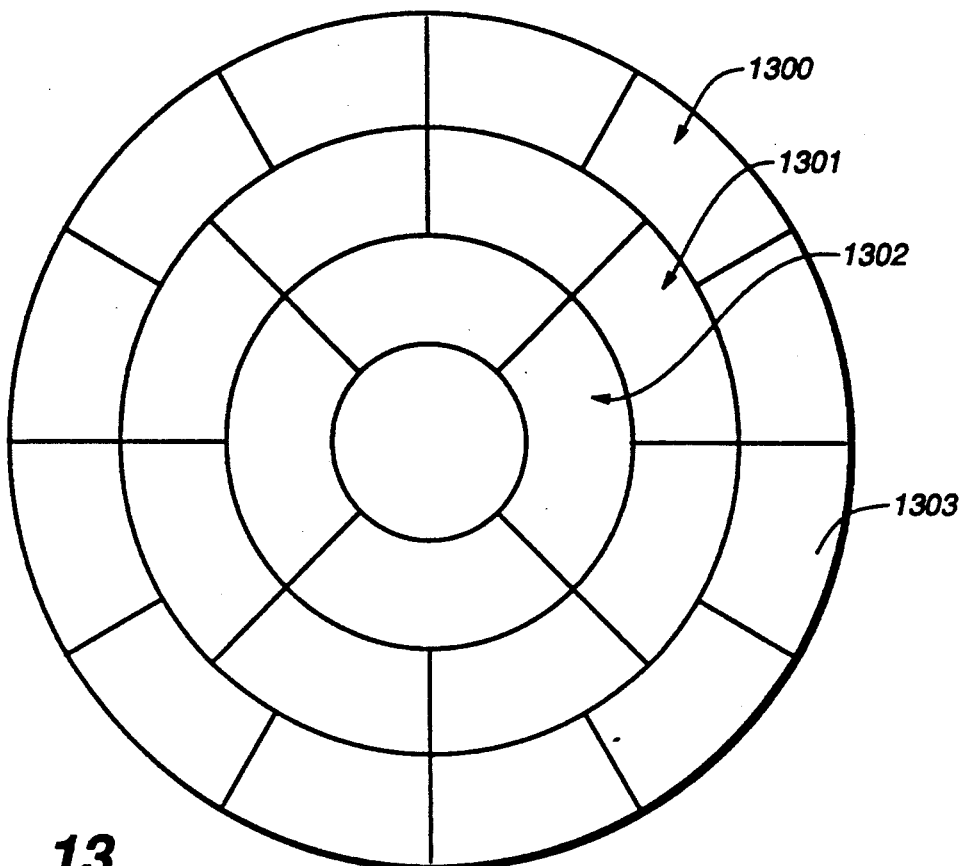
FIG._13
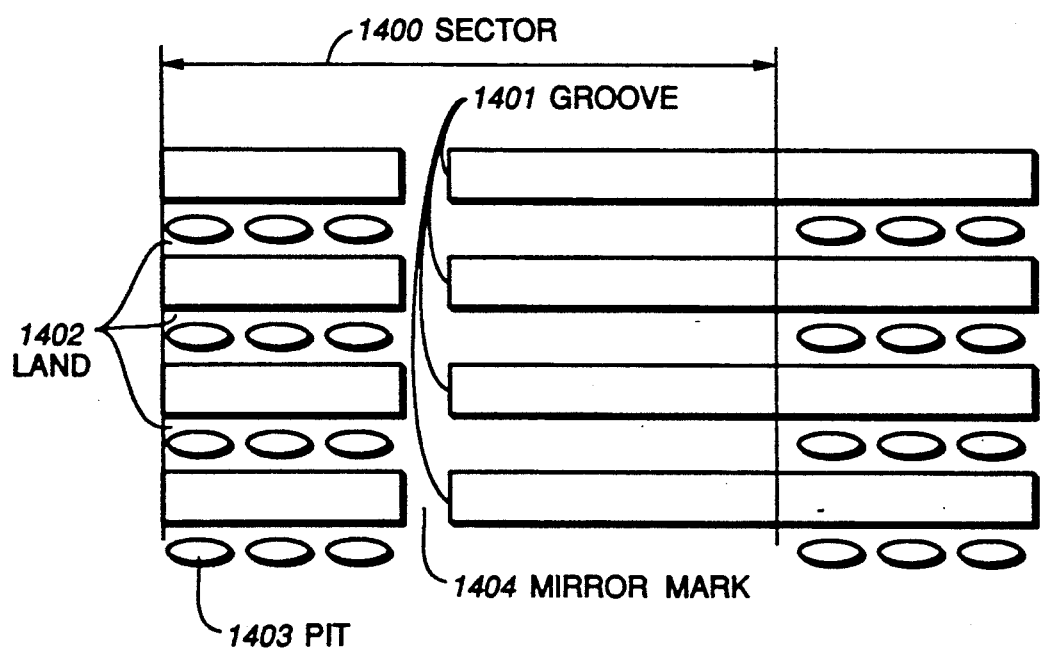
FIG._14

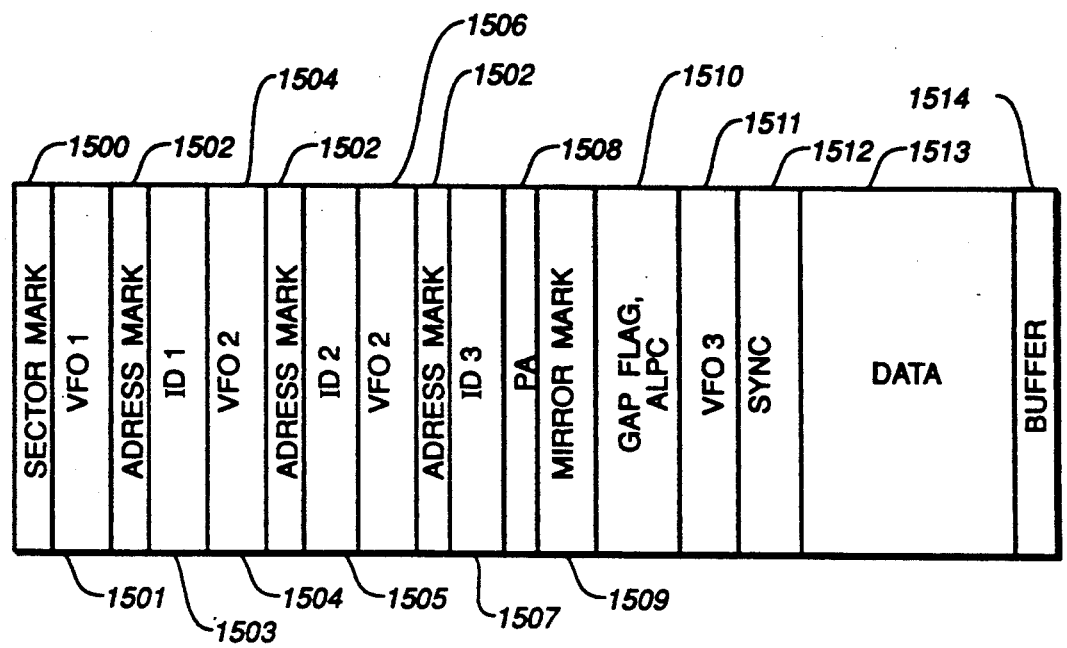
FIG._15
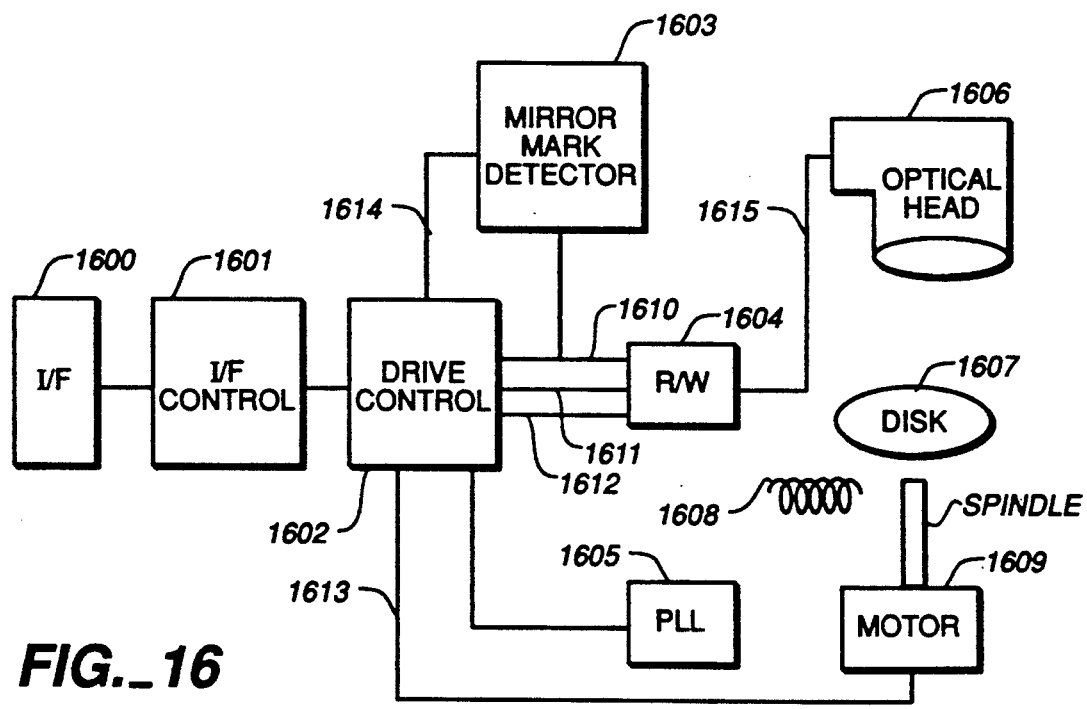
FIG._16

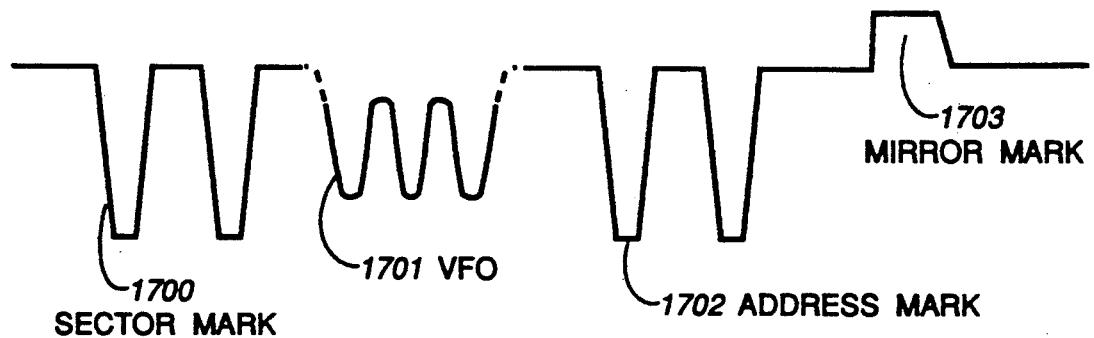
FIG._17
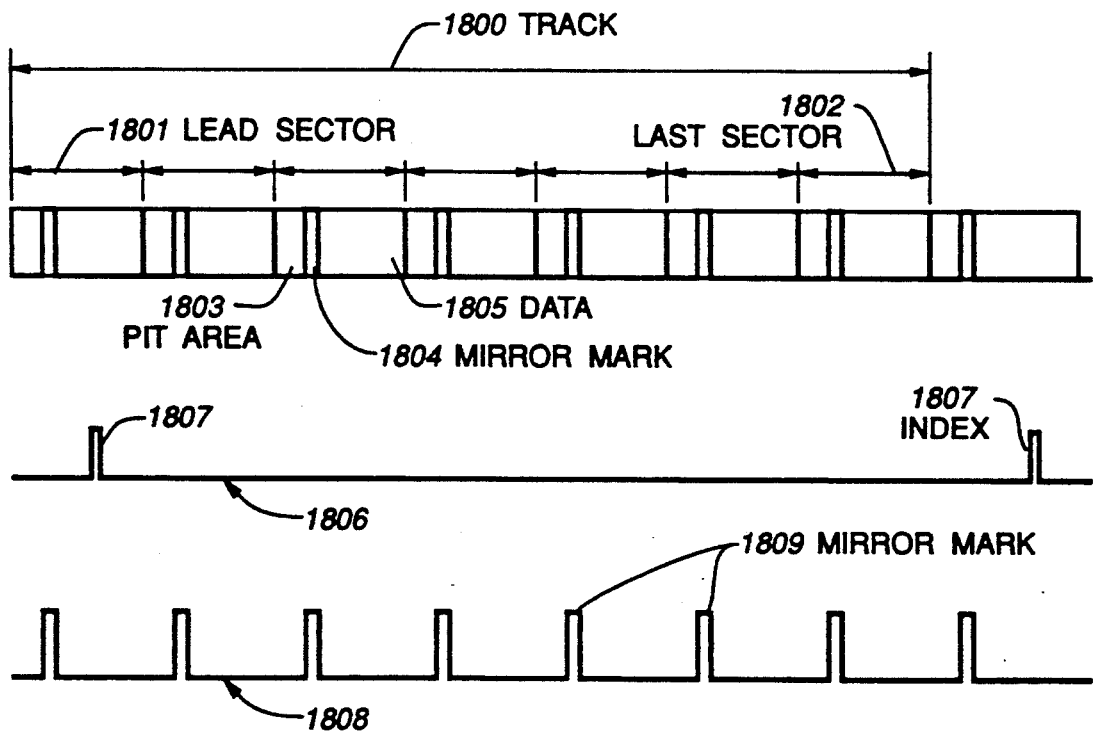
FIG._18

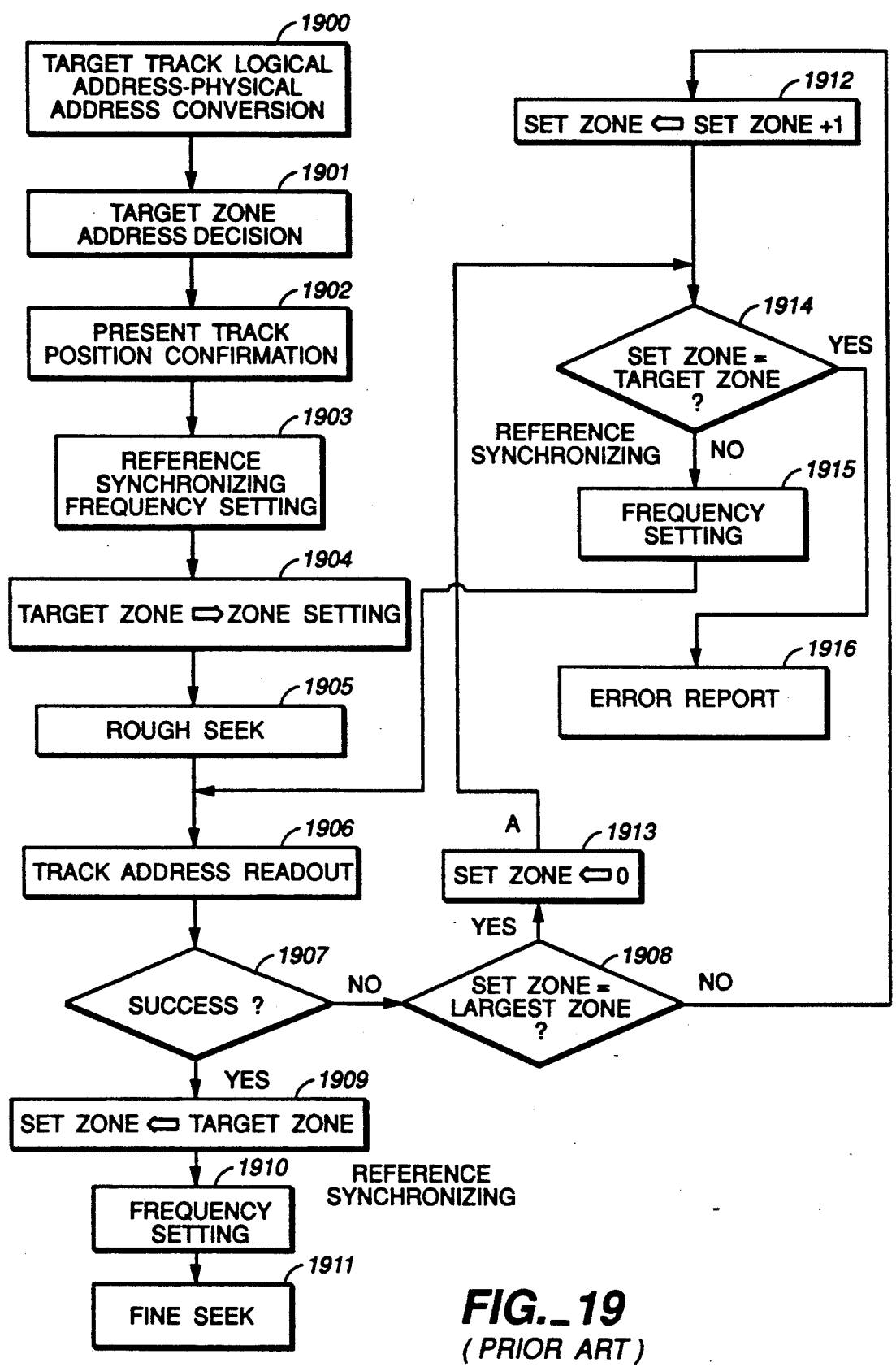
FIG._19
*(PRIOR ART)*

ZONE MISS RECOVERY SYSTEM FOR DISK DRIVES USING A MODIFIED CONSTANT ANGULAR VELOCITY (MCAV) METHOD OF DATA RECORDING

This is a continuation of copending application Ser. No. 07/744,183 filed Aug. 8, 1991, abandoned.

BACKGROUND OF THE PRESENT INVENTION

1. Field of Invention

The present invention relates generally to computer disk drives and specifically to solutions to the problem of zone misses in optical disk drive systems that depend on a modified constant angular velocity (MCAV) method of data recording.

2. Prior Art

Optical disk drives are susceptible to seek errors because track densities are usually very high. After a head seek operation, it is often necessary to do a seek verification that quickly reads the present track address and computes any error distance that must be crossed to get to a target track. To read the track address, a reference synchronizing frequency used in the data readout circuitry must correspond to a data recording frequency for the recording zone in which the head(s) actually landed. When a zone miss occurs, the two frequencies will not match, because the actual zone differs from the target zone, and the data in the tracks cannot be read.

A popular method used in prior art magnetic disk drive systems to increase the recording capacity of optical disk and optomagnetic disk drive systems is a modified constant angular velocity (MCAV) method. This kind of method partitions the media into a number of concentric circular zones, and changes the data recording frequencies in the respective zones with the objective of making the line density of data recording uniform over the media's entire surface. This method has the advantage of allowing very high recording densities. It requires switching a reference synchronizing frequency to an appropriate data recording frequency for the zone in which the head(s) is/are positioned.

Moving a head to a target track in optical disk drive systems requires about ten times the precision of magnetic disk drives because of the much higher track densities. So most optical disk drives use a two-stage method that consists of a rough seek to moves the head(s) near a target track, followed by a fine seek to position the head(s) precisely on the target track. A typical program sequence, implemented as drive firmware, is as follows:

(1) reference a conversion table in a read only memory of a disk drive to find a target zone that contains a target track;
(2) read a first track address to identify where a head is/are presently positioned and calculate a seek distance to the target track;
(3) set a reference synchronizing frequency to the data recording frequency of the target zone;
(4) move the head(s) to the vicinity of the target track with a rough seek;
(5) read a second track address to identify where the head(s) has/have been positioned after the rough seek and calculate any error relative to the target track; and
(6) do a fine seek based on the error.

A rough seek in an optical disk drive will generally get as close as several tracks to several tens of tracks of a target track. If the target track is near the zone boundaries, a "zone miss" phenomena may occur, the head(s) slips out of the target zone after the rough seek to an adjoining zone. The reference synchronizing frequency that is set will probably differ from the data recording frequency of the zone where the head(s) is/are actually positioned, so the optical disk drive circuit cannot read the track address of the track because it cannot synchronize to it. The present track address also cannot be read, so the head(s) is/are effectively lost. There is no way of knowing what the reference synchronizing frequency of the optical disk drive circuit was supposed to be.

The prior art typically uses procedures similar to the following steps to recover from a zone miss:

(1) increase (or decrease) the zone address setting of the disk drive circuit by one from the present address setting;
(2) switch the reference synchronizing frequency to the data recording frequency of the new zone address;
(3) re-read the track address;
(4) repeat steps (1), (2), and (3) when the track address cannot be read; and
(5) change the zone address to zero (or to the highest zone address) and return to step (2) when the zone address setting of the disk drive circuit reaches the highest zone address (or the address zero) of the media.

A prior art zone access method is flowcharted in FIG. 19. In step 1900, a logical address of a seek target sector of a command from a host computer is converted to a physical address. In step 1901, a address for a target zone corresponding to a physical track is indexed from a zone parameter table that has been pre-recorded in a memory within the optical disk system. In step 1902, the current track address is read before doing a rough seek. The difference in distance between the current track address and the target track address is computed to get the head(s) seek distance for a rough seek. In step 1903, the zone address setting is set to equal the address for a target zone. In step 1904, a reference synchronizing frequency is set to the data recording frequency of the target zone obtained in step 1901. In step 1905, the head(s) is/are moved to near the target track in a rough seek according to the seek distance computed in step 1902. In step 1906, a track address identifying where the head(s) is/are after the rough seek is read. In step 1907, the result of the track address reading operation is tested. If it succeeded, the reference synchronizing frequency of the optical disk drive circuit is set to the data recording frequency of the target zone in steps 1909 and 1910, and a fine seek occurs in step 1911. If unsuccessful in step 1907, the drive checks in step 1908 whether or not the present zone setting in the optical disk drive circuit is a maximum zone address for the media. If so, the new zone address setting of the optical disk circuit is set to address zero in step 1913. If the zone address is not a maximum, a new zone address setting is incremented by one, in step 1912. In step 1914, the new zone address setting is tested to see if it has returned to an initial zone address at start of zone access processing. When it does, a media error is reported in step 1916. If not, then in step 1915 the reference synchronizing frequency of the optical disk drive circuit is set to the data recording frequency of the zone that was new in steps 1912 or 1913, and control returns to the track address reading operation of step 1906.

Prior art zone access processing uses simple algorithms, it typically does not take into account any information concerning the conditions under which errors occur, and correct the reference synchronizing frequency usually in only one direction. Consequently, when a head is/are in an adjoining zone because of a zone miss and the zone switching direction is just the opposite, it takes a very long time for the optical disk drive circuit to get to a proper reference synchronizing frequency, and this significantly decreases the processing speed of the drive to a host computer.

There are other means of dealing with zone misses, including one of supplying a new zone in the area between adjacent zones and pre-recording the track address in this new zone with two types of data recording frequencies corresponding to both adjacent zones. (See, Japanese Patent Early Disclosures 1990-189769 and 1990-189742) A method of dividing each zone into a data zone and two buffer zones, one on each side of a data zone, so the buffer zones are sufficiently larger than the estimated seek error is described in Japanese Patent Early Disclosure 1990-183475. These methods are more-or-less effective in cases where comparatively small seek errors have been made. However, track address information must be pre-recorded on the media with two types of frequencies, so mastering of media becomes difficult, thus cost increases are inevitable. Also, the typical phase-locked loop (PLL) circuit becomes complicated, and this also makes higher costs unavoidable. Both methods are not interchangeable with the popular MCAV media now on the market, and is a great impediment in the optical disk drive market. Another problem with these methods is that the data recording area of the media is drastically reduced to make room for the buffer zones, the recording capacity per one media becomes smaller, and the principal advantages of the MCAV media are lost.

The present invention is one that resolves such prior art problems, and its object lies in offering a zone access means that recovers from zone misses quickly, and it is capable of using the MCAV media in the market without sacrificing any of the recording capacity.

SUMMARY OF THE PRESENT INVENTION

According to an embodiment of the present invention, a disk drive zone access method to be used when a head misses a target zone during a seek operation comprises:
switching a reference synchronizing frequency to the data recording frequency of an adjacent zone nearest to the seek target track; and
switching a reference synchronizing frequency to the data recording frequency of an adjacent zone second nearest from the seek target track.

According to an alternative embodiment of the present invention, a disk drive zone access method to be used when a head misses a target zone during a seek operation comprises:
defining a memory space in which to store a zone miss history;
referencing the zone miss history as a basis for estimating a candidate zone where the head(s) is/are likely to be presently positioned;
setting a reference synchronizing frequency to the data recording frequency of the candidate zone; and
updating the zone miss history with current zone miss data.

According to another alternative embodiment of the present invention, a disk drive zone access method to be used when a head misses a target zone during a seek operation comprises:
defining a memory space to stores zone miss history in alternative memory spaces according to the head(s) seek direction at the time of a zone miss;
referencing the one zone miss history that corresponds to the present head(s) seek direction;
estimating a candidate zone where the head(s) is/are most likely to be positioned after the zone miss;
setting a reference synchronizing frequency to the data recording frequency of the candidate zone; and
updating zone miss history in the memory space with the present zone miss data.

According to another alternative embodiment of the present invention, a disk drive zone access method to be used when a head misses a target zone during a seek operation comprises:
measuring the number of mirror marks in a track where the head(s) is/are; and
using the number measured to set a reference synchronizing frequency.

According to another alternative embodiment of the present invention, a disk drive zone access method to be used when a head misses a target zone during a seek operation comprises:
measuring the frequency period of mirror marks in a track where the head(s) is/are; and
using the frequency period measured to set a reference synchronizing frequency.

An advantage of the present invention is that embodiments of it can be implemented by merely modifying the firmware of the drive, without requiring great modifications or supplemental additions to prior art systems.

Another advantage of the present invention is that recovery after a zone miss is quick because the processing method most suitable to the situation is used, which is based on the available information, and that prevents disk drive response time slowdowns.

Another advantage of the present invention is that available information when zone misses occur is used, and is therefore able to reliably estimate the zone in that the head(s) is/are presently positioned and determines the reference synchronizing frequency in a short time.

Another advantage of the present invention is that it can be realized by modifying the only firmware in an existing drive. There is need to change the media format or to make substantial modifications to the drive's circuitry. In this manner the present invention does zone access processing simply and efficiently, thus preventing a slowdown to a host computer.

Other objects and attainments together with a fuller understanding of the present invention will become apparent and appreciated to those skilled in the art by referring to the following description and claims taken in conjunction with the accompanying drawings.

BRIEF DESCRIPTION OF THE DRAWINGS

FIG. 1 is a flowchart for a zone miss recovery method, according to a first embodiment of the present invention;

FIG. 2 is a flowchart of an exemplary zone access order control process that can be used to implement step 102 of FIG. 1;

FIG. 3 is a flowchart of another exemplary zone access order control process that can be used to implement step 102 of FIG. 1;

FIG. 4 is a flowchart for a zone miss recovery method, according to a second embodiment of the present invention;

FIG. 5 is a flowchart of an exemplary adjacent zone access order control process that can be used to implement step 403 of FIG. 4;

FIG. 6 is a flowchart of another example of adjacent zone access order control process that can be used to implement step 403 of FIG. 4;

FIG. 7 is a flowchart for still another alternative adjacent zone access order control process that can be used to implement step 403 of FIG. 4;

FIG. 8 is a flowchart for a zone miss history updating process;

FIG. 9 is a flowchart of a zone access method, constructed according to a fourth embodiment of the present invention;

FIG. 10 is a flowchart of track inquiry process that can be used to implement step 904 of FIG. 9;

FIG. 11 is a flowchart of an example of zone access process that can be used to implement step 1000 of FIG. 10;

FIG. 12 is a flowchart of a zone access process, constructed according to a fifth embodiment of the present invention;

FIG. 13 is a layout of the sectors for a zone recording type optical media;

FIG. 14 illustrates a pregrooved optical media;

FIG. 15 diagrams the structure of a typical sector;

FIG. 16 is a block diagram complete system, according to an embodiment of the present invention;

FIG. 17 is a diagram of various signal waveforms;

FIG. 18 is a timing diagram for example index and mirror mark detection signals; and FIG. 19 is a flowchart of a prior art zone access method.

DETAILED DESCRIPTION OF THE EMBODIMENTS

First Embodiment

FIG. 1 flowcharts an exemplary zone access method, according to a first embodiment of the present invention. In step 100, a logical address for a target sector called for in a seek command from a host computer is converted into a physical address that depends on a disk drive's configuration. The physical address is conventionally calculated taking into account the number of heads in the disk drive, the number of sectors per track, and the number of defective sectors in the media. The physical address consists of both a physical track address and a physical sector address. In step 101, the address for a target zone to which the physical track address belongs is determined. This can be done, e.g., by referencing a zone parameter table prerecorded in the memory space. In step 102, the zone access order of the two adjacent zones comprising the inner adjacent zone and the outer adjacent zone adjoining the address for a target zone obtained in step 101 is determined by the following means. In step 103, the track address where the head(s) is/are presently positioned is read as a preliminary stage of the seek. The difference in distance between the track address of this readout and the target track address is computed, to get the distance required for the seek. In step 104, the zone address is set to the address for a target zone, and in step 105 the reference synchronizing frequency of the circuit switches to the data recording frequency of the zone address set in step 104. In step 106, the head(s) does a rough seek to near the target track based on the seek distance computed in step 103. In step 107, the track address identifying where the head(s) is/are after the rough seek is read. Here, it will be necessary to synchronize the data recording frequency of the track address with the reference synchronizing frequency, to detect the sector and address marks, and to read the track address within a predetermined time. After a rough seek, there is ordinarily an error of several tracks to several tens of tracks between the target track and the track where the head(s) actually is. If the actual after-seek track is in the same media zone as the target track, the track address can be read by synchronizing the reference synchronizing frequency to the data recording frequency for the whole zone. However, when a target track is near or at a media zone boundary, there is a chance that the actual after-seek track will not correspond to the right zone, but to an adjacent one. Since the data recording frequency of the adjacent zone will differ, it cannot be synchronized and its track address cannot be read within the time allowed. In step 108, the success or failure of the track address readout in step 107 is checked. If successful, step 109 issues a seek correction (a fine seek) after computing a position error between the actual after-seek track address and the target track address. If a failure is discovered in step 108, then a branch is made to step 110, where the zone address is set to the primary zone address, based on the zone access order determined in step 102. In step 111, a reference synchronizing frequency is set to the data recording frequency of the new zone. In steps 112 and 113, a track address is read again in the same manner as steps 107 and 108, and the result is checked. If the result indicates success, the zone access process ends. The target zone becomes the new zone setting in step 119. The reference synchronizing frequency is set to the data recording frequency of the target zone in step 120. And the fine seek starts in step 109. When a failure is discovered in step 113, then step 114 sets the zone in the disk drive's circuitry to the adjacent zone second address determined in step 102. In step 115, it corresponds to the reference synchronizing frequency of the circuit. In steps 116 and 117, a track address readout is similar to steps 107 and 108, and the result is checked. If successful, the zone access process ends. In steps 119 and 120 the secondary zone address becomes the target zone setting, the reference synchronizing frequency is set to the data recording frequency of this target zone, and the fine seek starts in step 109.

Ordinarily, the number of tracks per zone is on the order of several hundred, so a head almost never misses an adjoining zone in a rough seek. But if step 117 determines there to be a failure, further zone access process is done in step 118, for outside the target zone and the two adjacent zones, followed by passing through steps 119 and 120 to do the fine seek in step 109.

FIG. 2 is a flowchart of an exemplary adjacent zone access process. Media track address zero is on the inside and track addresses increase stepping out toward the outer perimeter. In step 200, the address of the first track of the target zone is determined. In step 201, an offset value between the address of the first track and the target track is computed. In step 202, the track offset value is compared to one half of the number of tracks per zone. When the target track is nearer the inside of the target zone, step 204 chooses the inner adjacent zone to be the primary zone, and the outer adjacent zone to be the secondary one. When the target track is nearer the outside of a target zone, step 203 chooses the outer adjacent zone to be the primary zone, and the inner adjacent zone to be the secondary one. When a address for a target zone is set to either extreme of the media, only one adjacent zone exists, so the only zone that is adjacent is set to be the primary zone.

FIG. 3 flowcharts another example of an adjacent zone access process for FIG. 1. The track address layout is assumed to be the same as that described above for FIG. 2. In step 300, the address of the first track of the target zone is determined. In step 301, a first offset value of the address of the first track to the target track is determined. In step 302, the address of the first track of the zone adjoins the outer side of the target zone is determined. The address of this adjacent zone is the address for a target zone plus one. In step 303, a second offset value of the address of the first track to the target track is calculated. In step 304, the first and second offsets are compared. When the first offset is equal to or less than the second offset, step 305 sets the inner adjacent zone to be accessed first, and the outer one second. When the first offset is greater than the second offset, step 306 sets the outer adjacent zone to be accessed first and the inner secondary zone. When the address for a target zone is at either extreme of the media, there is only one adjacent zone, and that becomes the primary zone to access.

Second Embodiment

FIG. 4 flowcharts a zone access method, according to a second embodiment of the present invention. In step 400, the logical address of a target sector is converted into a physical address, according to the organization of the particular disk drive. In step 401, an address for a target zone containing the physical track is determined. In step 402, the current track address is read before doing a rough seek. The distance from the present track address to the target track address is calculated to get the distance needed for a rough seek. In step 403, the zone access sequence is determined, as in FIGS. 2 and 3, and is based on the address for a target zone and the physical track address. In step 404, the zone address the drive is set to is made the address for a target zone. In step 405 the circuit reference synchronizing frequency switches to the data recording frequency of the zone address set in step 404. In step 406, the head(s) does a rough seek to get near the target track, based on the computation of the seek distance done in step 402. In step 407, the actual after-seek track address is read to identify where the head(s) actually is after a rough seek. The reference synchronizing frequency must be set to match the data recording frequency of the actual after-seek track. A specified time period is allowed to read the track address. If the actual after-seek track is within the same zone as the target track, the track address can be read by synchronizing the reference synchronizing frequency to the data recording frequency of the present track. However, when the actual after-seek track is not in the same zone, the data recording frequency of the adjoining zone will be too different from the reference synchronizing frequency (set in step 405), and the track address cannot be read. In step 408, the results of the track address readout operation are determined. When it has been successful, step 409 computes the position error between the actual after-seek track address and the target track address, in order to do a fine seek. But if there has been a failure, a zone access process begins, starting with step 410. In step 410, the zone address the drive is set to is made the primary zone address. In step 411, the reference synchronizing frequency is set to the data recording frequency for this zone. In steps 412 and 413, a track address readout precedes as in steps 407 and 408, and a result is determined. If the readout was successful, the zone access process ends. Control branches to step 419. The original target zone becomes the target zone. In step 420, the reference synchronizing frequency is set to the data recording frequency for this target zone. A history variable is updated, based on the results of this zone access procedure in step 421 (described below), and a fine seek (step 409) begins. If a failure is detected in step 413, control passes to step 414 where the zone value in the disk drive is set to equal the secondary zone address determined in step 403. In step 415, the reference synchronizing frequency is set to the data recording frequency of the target zone. In steps 416 and 417, a track address is readout, similar to how it was done in step 408, and the results are checked. If the results indicate success, the zone access process ends. In steps 419 and 420 the target zone set in the disk drive becomes the original target zone, and the reference synchronizing frequency is set to the data recording frequency of the target zone. In step 421, a history variable is updated, and a fine seek of in step 409 begins. If the track address readout fails in step 417, then step 418 begins further zone access processing for other than the target zone or the two adjacent zones, and passes through 419, 420 and 421 to start the fine seek in step 409 (no zone miss history updating occurs).

FIG. 5 is a flowchart of an exemplary adjacent zone access order process (sub-routine) for step 403 of FIG. 4. The more positive a zone miss history is, the stronger will be the tendency of the actual after-seek track to be in the outer adjacent zone of the target zone. Conversely, the more negative the zone miss history, the stronger the tendency is for the adjacent zone inside the target track to be the right one. In step 500, the zone miss history is tested for sign.

When positive, step 501 makes the outer adjacent zone the primary zone and the inner adjacent zone the secondary zone. When the zone miss history is not positive, step 502 makes the inner adjacent zone the primary zone and the outer adjacent zone the secondary zone.

FIG. 6 is an alternative process to that of FIG. 5. A first zone miss history stores the number of times that the actual after-seek track was in the adjacent zone outside the target zone. A second zone miss history similarly stores the number of times it was in the adjacent zone inside. In step 600, the first and second zone miss histories are compared. If the first is larger than the second, step 601 sets the outer adjacent zone to be the primary zone and the inner adjacent zone to be the secondary zone. If the first zone miss history is equal to or smaller than second zone miss history, step 602 sets the inner adjacent zone to be the primary zone and the outer adjacent zone to be the secondary zone.

Third Embodiment

FIG. 7 is an alternative process to that of FIGS. 5 and 6, and represents a third embodiment of the present invention. As above, the first and second zone miss histories respectively store the number of times the actual after-seek track was in the inner adjacent zone of the target zone after inward seeks and the number of times it was in the outer adjacent zone after inward seeks. A third and a fourth zone miss history similarly hold the number of times the actual after-seek track was in the inner adjacent zone of a target track after outward seeks and the number of times in the outer adjacent zone after outward seeks. (Put another way, the four zone miss histories keep seek statistics to help predict the best direction to try an adjacent zone access first.) In step 700, a decision is made whether to seek-in or seek-out. This may be decided by comparing the present track address and the address of the target track. If a seek-in is decided in step 700, then step 701 references a seek-in zone miss history table (the first and second zone miss histories) is referenced. In step 702, the first zone miss history is compared with the second zone miss history. When the first is not larger than the second, step 703 sets the outer adjacent zone to be the primary zone and the inner adjacent zone to be the secondary zone. If the first zone miss history is larger than the second zone miss history in step 702, step 706 sets the inner adjacent zone to be the primary zone and the outer adjacent zone to be the secondary zone.

When a seek-out is determined in step 700, step 704 references a seek-out zone miss history table (the third and fourth zone miss histories). In step 705, the third zone miss history and the fourth zone miss history are compared. If the third is larger than the fourth, step 706 sets the inner adjacent zone to be the primary zone and the inner adjacent zone to be the secondary zone. If the first zone miss history is equal to or smaller than the second zone miss history in step 705, step 703 sets the outer adjacent zone to be the primary zone and the inner adjacent zone to be the secondary zone.

FIG. 8 flowcharts an exemplary zone miss history update process (sub-routine) for step 421 in FIG. 4. This zone miss history update process suits the adjacent zone access sequence control process of FIG. 5. In step 800 a determination is made as to whether the reference synchronizing frequency has successfully synchronized by using the outer adjacent zone. If so, step 801 increments by one the respective zone miss history. If not, step 802 determines whether the reference synchronizing frequency has successfully synchronized using the inner adjacent zone. If so, the zone miss history is decremented by one. Otherwise, this means that neither the outer nor the inner adjacent zone resulted in a good readout, so no updating of the zone miss history is warranted.

Fourth Embodiment

FIG. 9 flowcharts a head seek process for a zone access method, according to a fourth embodiment of the present invention. Beginning in step 900, a logical address for a target sector is converted into a physical address, according to the organization of the particular disk drive. In step 901, the address for a target zone containing the physical track is determined from the physical track address. In step 902, a current track address is read before doing a seek. In step 903, the results of the read are judged. If the read was successful, step 905 determines the head(s) seek distance needed to do a seek. If unsuccessful, step 904 begins a track inquiry process (described below).

External shocks or vibrations inflicted on a disk drive can cause the head(s) to be moved inadvertently to another zone. Consequently, the data recording frequency of the zone and the reference synchronizing frequency of the drive's circuitry will not match, and the correct zone will be unknown and harder to determine. In step 904, the zone in which the head(s) is/are actually positioned is found by stepping through all the possible reference synchronizing frequencies until a frequency that works is found. In step 906, the reference synchronizing frequency is set to the data recording frequency of the target zone based on the result in step 901. In step 907, the head(s) is/are moved. In step 908, the track address is read where the head(s) is/are actually positioned after the seek. In step 909, the result of the readout operation is analyzed. If the head(s) has/-have entered an adjacent zone that is not the target zone, the data recording frequency of the adjacent zone will differ from the reference synchronizing frequency set in step 906. So the track address cannot be read. If the readout operation is successful in step 909, step 911 compares the actual after-seek track address with the target track address. If they agree, the process ends in step 912. If not, any remaining position error between the target track address and the actual after-seek track is computed, and the seek is repeated. If the readout operation is unsuccessful in step 909, step 910 does a track inquiry process similar to step 904, the track address is read, and control passes to to step 911.

FIG. 10 is an exemplary track inquiry process (sub-routine) that implements step 904 (FIG. 9). Step 1000 is a zone access process (described in detail, below). In step 1001, the reference synchronizing frequency is set based on the process results obtained earlier. In step 1002, the track address is read.

FIG. 11 flowcharts an exemplary zone access process that implements step 1000 (FIG. 10). Determining the zone address for a track is done by counting the number of mirror marks that have been placed in the particular track. ("Mirror marks" are used in patterns of dull and shiny spots on a disk that can be seen by photodetectors mounted near the head[s], e.g., mirror mark 1404, below.) In step 1100, a mirror mark count register is initialized to zero. Steps 1101 and 1102 wait for and confirm receipt of an index pulse that is generated by the drive each disk rotation. After the index pulse is detected, steps 1103 and 1104 recognize individual mirror marks by using a total sum signal output from the head(s). In step 1105, the mirror mark count register is incremented by one. Steps 1103 through 1105 are repeated until the next index pulse arrives. Thus the number of mirror marks in one track are counted (the result is retained in the mirror mark count register). Then step 1107 uses the mirror mark number to index a pre-recorded table in memory to get the number of sectors per track in each zone and the zone address of the head(s).

Fifth Embodiment

FIG. 12 flowcharts a zone access method, according to a fifth embodiment of the present invention, that measures the time periods between mirror marks to identify the current zone address. In step 1200, a mirror mark period register is initialized to zero. In steps 1201 and 1202 mirror marks are detected and confirmed. Step 1203 starts a mirror mark timer, which keeps on running until the next mirror mark in the following sector is received in steps 1204 and 1205. Step 1206 stops the timer. Step 1207 uses the mirror mark period to index a pre-recorded table in memory to get the number of sectors per track in each zone and the zone address of the head(s).

FIg. 13 shows how a typical optical disk sector is laid out when using the zone recording method. There are three zones, namely zones 1300 to 1302. (Describing only three zones here is meant to make the description clearer, an actually implementation will use many more zones.) A sector 1303 is typical of all the sectors on the disk. The number of sectors per single track varies depending on where a zone is located, fewer sectors can be accommodated in the inner zones. Zone 1300 has 12 sectors per track, zone 1301 has eight sectors per track, and zone 1302 has six sectors per track. Mirror marks are associated with sectors on a one-for-one basis, and the number of mirror marks in a track also varies.

FIG. 14 illustrates an optical media with continuous grooves. A distance 1400 indicates the length of one sector. The media has a groove 1401, a land 1402 that serves as a data recording area, a pit 1403 which stores a sector address, and a mirror mark 1404. Groove 1401 is separated by mirror mark 1404 so a laser beam will reflects differently between them. The reflectance differs from other parts, and the drive's circuitry can easily discriminate the mirror mark 1404 by observing the reflected beam.

FIG. 15 illustrates the structure of a typical sector comprising a sector mark 1500 identifying the start of the sector, a VFO1 data 1501, a VFO2 data 1504, a VFO2 data 1506, a VFO3 data 1511, and an address mark 1502 that identifies the start of the sector address recording zone. And ID1 data 1503, ID2 data 1505, and ID3 data 1507 are for when the sector addresses are recorded with pits (e.g., pit 1403). A preamble zone 1508, a mirror mark 1509, a gap flag or an automatic laser power control zone ALPC 1510, a synchronizing zone 1512, a data zone 1513, and a buffer zone 1514 are also included. One mirror mark 1509 only is present between a pit zone and a data zone in each such sector.

FIG. 16 shows a block diagram an alternative embodiment of the present invention. A system comprises a host computer interface (I/F) 1600, an interface controller 1601, a drive controller 1602, a mirror mark sensor 1603, a read/write (R/W) signal processor 1604, a PLL controller 1605, optical head(s) 1606, a disk media 1607, a magnetic field generating coil 1608, a spindle motor 1609, a pit read signal 1610, a differential data readout signal 1611, a head position signal 1612 used for tracking and focusing control of the optical head(s), an index signal 1613 generated from the spindle motor once each revolution, a mirror mark detection signal 1614 that is generated each time mirror mark signal sensor 1603 detects the mirror marks via signal 1610, and a read data signal 1615 by the optical head(s) 1606 that use a laser beam for reading. Signal 1610 has a different signal level for the mirror mark regions versus the other regions, as will be illustrated in the discussion of FIG. 17, below. Mirror mark sensor 1603 does signal level discrimination and generates mirror mark detection signal 1614 when it senses a mirror mark. Drive controller 1602 is notified of the mark detection. Index signal 1613 is output from spindle motor 1609 once each rotation of media 1607. When drive controller 1602 receives index signal 1613, it counts the individual pulses belonging to mirror mark detection signal 1614 to determine what zone the head(s) is/are in. Drive controller 1602 can also determine the zone of the current track by measuring the frequency or period of the pulses belonging to mirror mark detection signal 1614. This does not require using index signal 1613. When drive controller 1602 has determined the zone of the track, it sends PLL controller 1605 a command to change the reference synchronizing frequency to the frequency corresponding to the zone of the track where head(s) 1606 is/are presently positioned.

FIG. 17 illustrate a typical waveform for signal 1610 (FIG. 16). It comprises a sector mark pulse 1700, a VFO pulse 1701, an address mark pulse 1702, and a mirror mark pulse 1703. Because the signal level of the mirror mark pulse is the highest, as compared to signal waveforms of the other regions, it is easy to detect.

FIG. 18 is an exemplary set of timing diagrams for an index signal and a mirror mark detection signal in one part of a track. Time 1800 is one complete track rotation long. A first sector 1801 begin the track and a final sector 1802 ends it. A pit zone 1803 is contained in each sector, as are a mirror mark zone 1804, a data zone 1805. An index signal 1806 is output from the spindle motor and compresses an index pulse 1807 that is generated once for each cycle of the media. A mirror mark detection signal 1808 has a mirror mark pulse 1809. Signal 1806 is representative of the index signal 1613 (FIG. 16). Similarly, signal 1808 is representative of mirror mark detection signal 1614 (FIG. 16). The position of index pulse 1807 does not necessarily agree with the start of first sector 1801. Since index pulse 1807 is always generated at the same point, measuring mirror mark pulses 1809 for one rotation of a track will not be difficult. Drive controller 1602 starts to count mirror mark pulses by first recognizing the leading index pulse 1807 at the left of FIG. 18. The count starts at the second from the left mirror mark pulse 1809, and a total of seven (in this example) mirror mark pulses are counted before the index pulse 1807 on the right is received.

While the present invention has been described in conjunction with several specific embodiments, it is evident to those skilled in the art that many further alternatives, modifications and variations will be apparent in light of the foregoing description. Thus, the present invention described herein is intended to embrace all such alternatives, modifications, applications and variations as may fall within the spirit and scope of the appended claims.

What is claimed is:

1. A zone access method for a disk drive having partitions in a recording media disposed in several concentric recording zones each of the zones having a different data recording frequency and a plurality of tracks, the disk drive having a means of generating a reference synchronizing frequency used to read data from the media when the reference synchronizing frequency matches a particular data recording frequency, the method being employed if during a seek to a track that has been targeted ("target track"), a head has not been positioned in the zone containing the target track, the method comprising the steps of:

switching the reference synchronizing frequency to the data recording frequency of the adjacent zone nearest to the target track, said nearest adjacent zone being one of as many as two zones that are adjacent to the zone containing the target track; and if the reference synchronizing frequency still does not match the particular data recording frequency, then taking the step of switching the reference synchronizing frequency to the data recording frequency of the secondary zone nearest to the target track, said second nearest adjacent zone being the other of as many as two zones that are adjacent to the zone containing the target track.

2. A zone access method for a disk drive having partitions in a recording media disposed in several concentric recording zones each of the zones having a different data recording frequency and a plurality of tracks, the disk drive having a means of generating a reference synchronizing frequency used to read data from the media when the reference synchronizing frequency matches a particular data recording frequency, the method being employed if during a seek to a track that has been targeted ("target track"), a head has not been positioned in the zone containing the target track, the method comprising the steps of:

defining a memory space for storing a zone miss history;

referencing said zone miss history if the head has missed the target zone during a target track seek;

nominating a zone where the head is likely to be presently positioned after a zone has been missed, the nomination based on said zone miss history;

switching the reference synchronizing frequency to the data recording frequency of the nominated zone, and updates zone miss history in the memory space with the present zone miss data.

3. The method of claim 2, wherein:

the defining a memory space to store zone miss history is separated according to a head seek direction at the time a zone miss occurred; and the referencing said zone miss history is limited to data collected for zone misses that occurred in the same direction as the direction of the present zone miss.

4. A zone access method for a disk drive having partitions in a recording media disposed in several concentric recording zones each of the zones having a different data recording frequency and a plurality of tracks, the disk drive having a means of generating a reference synchronizing frequency matches a particular data recording frequency, the media having a plurality of mirror marks associated with the tracks, a different number of mirror marks being associated with the different zones, the method being employed if during a seek to a track that has been targeted ("target track"), a head has not been positioned in the zone containing the target track, the method comprising the steps of:

measuring the number of mirror marks in a particular track where the head is at on the media when a zone miss has occurred during a seek of the head to a target track; and setting the reference synchronizing frequency in response to the number of mirror marks.

5. A zone access method for a disk drive having partitions in a recording media disposed in several concentric recording zones each of the zones having a different data recording frequency and a plurality of tracks, the disk drive having a means of generating a reference synchronizing frequency used to read data from the media when the reference synchronizing frequency matches a particular data recording frequency, the media having a plurality of mirror marks associated with the tracks, a different number of mirror marks being associated with the different zones, the method being employed if during a seek to a track that has been targeted ("target track"), a head has not been positioned in the zone containing the target track, the method comprising the steps of:

measuring the frequency of mirror marks in a particular track where the head is at on the media when a zone miss has occurred during a seek of the head to a target track; and setting the reference synchronizing frequency in response to the frequency of mirror marks.

6. A disk drive zone access method for recovering from a zone miss of a disk drive head having a plurality of media zones that use different data recording frequencies and means to read data with a variable reference synchronizing frequency that can be set to match any one of the data recording frequencies, the method comprising the steps of:

setting the variable reference synchronizing frequency to the data recording frequency of an adjacent zone nearest to the seek target track; and setting the variable reference synchronizing frequency to the data recording frequency of an secondary zone nearest from the seek target track.

7. A disk drive zone access method for recovering from a zone miss of a disk drive head having a plurality of media zones that use different data recording frequencies and means to read data with a variable reference synchronizing frequency that can be set to match any one of the data recording frequencies, the method comprising the steps of:

defining a memory space in which to store a zone miss history;

referencing the zone miss history as a basis for estimating a candidate zone where the head is likely to be;

setting the variable reference synchronizing frequency to the data recording frequency of the candidate zone; and updating the zone miss history with current zone miss data.

8. A disk drive zone access method for recovering from a zone miss of a disk drive head having a plurality of media zones that use different data recording frequencies and means to read data with a variable reference synchronizing frequency that can be set to match any one of the data recording frequencies, the method comprising the steps of:

defining a memory space to store zone miss history in alternative memory spaces according to the head seek direction at the time of a zone miss;

referencing the one zone miss history that corresponds to the present head seek direction;

estimating a candidate zone where the head is most likely to be after the zone miss based on the zone miss history;

setting the variable reference synchronizing frequency to the data recording frequency of the candidate zone; and updating zone miss history in the memory space with the present zone miss data according to the head seek direction at the time of the zone miss.

9. A disk drive zone access method for recovering from a zone miss of a disk drive head having a plurality of media zones that use different data recording frequencies and means to read data with a variable reference synchronizing frequency that can be set to match any one of the data recording frequencies, the method comprising the steps of:

measuring the number of a plurality of mirror marks in a particular track within a zone where the head is; and using the number of marks measured to set the variable reference synchronizing frequency.

10. A disk drive zone access method for recovering from a zone miss of a disk drive head having a plurality of media zones that use different data recording frequencies and means to read data with a variable reference synchronizing frequency that can be set to match any one of the data recording frequencies, the method comprising the steps of:

measuring the frequency period of mirror marks in a track where the head is; and using the frequency period measured to set the variable reference synchronizing frequency.

11. A disk drive and media having a plurality of media zones that use different data recording frequencies and means to read data with a variable reference synchronizing frequency that can be set to match any one of the data recording frequencies, the disk drive comprising:

memory means for storing zone miss histories in at least two different areas according to the head seek direction at the time of a zone miss;

means for referencing one of said zone miss histories according to the head seek direction corresponding to a current zone miss;

means for estimating a candidate zone where the head is most likely to be based on said zone miss history;

means for setting the variable reference synchronizing frequency to the data recording frequency of said candidate zone; and means for updating zone miss history in the memory space with the present zone miss data according to the head seek direction at the time of the zone miss.

* * * * *